United States Patent Office 3,020,203
Patented Feb. 6, 1962

3,020,203
AGENT FOR THE TREATMENT OF
TEMPORARY HOARSENESS
Lucien Harnist, Rua Aperana 117, Rio de Janeiro-Leblon, Brazil
No Drawing. Filed Jan. 11, 1960, Ser. No. 1,409
3 Claims. (Cl. 167—68)

This invention relates to a new agent against throat infections and more particularly to a new compound and method of using the compound to treat temporary hoarseness.

This application is a continuation in part of my copending application Serial No. 707,138, filed January 6, 1958, for "Aluminum Mandelate," now abandoned.

It is a primary object of the present invention to provide a new agent, and a new composition using the agent as active ingredient, to combat and relieve temporary hoarseness.

It is yet another object of the present invention to provide a method of treating temporary hoarseness.

Other objects and advantages of the present invention will be apparent from a further reading of the specification and of the appended claims.

The compound aluminum mandelate which is produced in accordance with the present invention is useful to relieve hoarseness caused by sore throats. This compound remains effective at the focus causing the temporary hoarseness and cannot readily be washed away from the focus. Therefore the compound gives a long action and also superior action against temporary hoarseness.

The compound can be applied topically, or it can be incorporated in a vehicle and applied for example to the throat to treat temporary hoarseness.

The compound of the present invention has been found to be highly effective in relieving hoarseness due to sore throats.

The aluminum mandelate of the present invention is a white crystalline material which is poorly soluble in water.

According to a preferred method of producing the compound of the present invention it is possible to obtain aluminum mandelate salts in which the molecular ratio of $Al_2O_3$ to $(C_6H_5CH(OH)COOH)$ can be 1:6, 1:3 or 1:2. All of these possible salts are meant to be comprehended within the term "aluminum mandelate."

There are three basic methods of producing aluminum mandelate in accordance with the present invention. It is possible to react calcium mandelate with aluminum sulfate preferably by boiling solutions of these substances in water together under refluxing for several hours with stirring. Such reaction results in the production of calcium sulfate and aluminum mandelate in practically quantitative yield.

It is also possible to react pure powdered aluminum with an aqueous solution of aluminum mandelate. This method results in the direct production of aluminum mandelate.

According to still another method of producing aluminum mandelate in accordance with the present invention mandelic acid is reacted with an alcoholate of aluminum such as aluminum methanolate or aluminum isopropanolate, preferably utilizing an alcohol solvent. It is this method that can result in the production of aluminum mandelate salts in which the molecular ratio of the aluminum to the mandelic acid radical can be varied.

The aluminum mandelate of the present invention may be utilized to treat and relieve temporary hoarseness, for example, by being incorporated into a tablet or wafer which is slowly dissolved in the mouth. Any suitable pharmaceutical carrier may be used in combination with the aluminum mandelate to form such tablet or wafer, for example, sugar, beta-lactose, cornstarch and sodium stearate, gelatin, gum tragacanth, sorbose, and dextrose.

The amount of aluminum mandelate used for this purpose may vary within extremely wide limits because aluminum mandelate is completely harmless to humans and completely without deleterious side effects, and small amounts of the aluminum mandelate are highly effective in relieving temporary hoarseness. A convenient single dose tablet for this purpose would be a 1½ gram tablet containing ½–5 grains of aluminum mandelate which may be taken as often as desired, but which is usually needed only once every three hours for one to two days to completely relieve the temporary hoarseness.

The following examples are given to further illustrate the present invention. The scope of the invention is not, however, meant to be limited to the specific details of the examples.

Example 1

10.27 grams of calcium mandelate are dissolved in 900 cc. of boiling water. 6.66 grams of aluminum sulfate, $Al_2(SO_4)_3 \cdot 18H_2O$, dissolved in 50 cc. of water are added to the calcium mandelate solution. The reaction mixture is boiled under refluxing for about 2 hours while stirring.

The reaction results in the formation of insoluble calcium sulfate which is separated from the liquid by filtration. Evaporation of the filtrate results in the precipitation of white crystals of aluminum mandelate.

Example 2

Pure, finely divided aluminum is washed, attacked by sulfuric acid and washed again. Thereupon, 2.7 grams of this pure powdered aluminum are slowly dissolved while heating into a solution of 40 grams of mandelic acid in 5 liters of water. The aluminum mandelate which is formed is in dissolved condition in the water and it may be used directly in this condition as an antiseptic agent. To obtain the pure aluminum mandelate it is simply necessary to crystallize the aluminum mandelate by concentration of the solution, e.g. by evaporation of the water under vacuum.

Example 3

45.64 grams of mandelic acid dissolved in methanol are added slowly under stirring to a solution of 12.0 grams of aluminum methanolate dissolved in 500 cc. of methanol. The reaction mixture is heated under refluxing for 1 hour. The resulting compound, aluminum mandelate, is precipitated and separated from the liquid by filtration. The molecular ratio of aluminum to the mandelic acid radical in this salt is 1:3. By adjustment of the ratio of aluminum methanolate to mandelic acid in the above reaction it is possible to obtain aluminum mandelate in which the ratio of aluminum to the mandelic acid radical is 1:2 or 1:6 in addition to the above normal aluminum mandelate in which the ratio is 1:3.

It is possible to utilize instead of aluminum methanolate another alcoholate of aluminum such as aluminum ethanolate, aluminum isopropanolate or aluminum butanolate.

It is also possible to produce aluminum mandelate by reacting freshly precipitated aluminum hydroxide with an aqueous solution of mandelic acid.

All of the above reactions give excellent yields. The reaction of Example 1 gives practically quantitative yields while the reaction of the other examples only give slightly lesser yields.

Example 4

Wafers containing aluminum mandelate are prepared in accordance with the following formulas:

| | | |
|---|---|---|
| Aluminum mandelate | mg | 30 |
| Granulated sugar | gms | 1.2 |
| Wild cherry flavor, q.s. | | |

The above is prepared in the form of a compressed wafer.

Example 5

| | | |
|---|---|---|
| Aluminum mandelate | mg | 45 |
| Powdered sugar | gm | 1 |
| Sodium stearate | mg | 20 |
| Lemon flavor, q.s. | | |

Examples 4 and 5 result in compressed wafers which are utilized by placing on the tongue and allowing to dissolve slightly.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A composition for the relief of temporary hoarseness comprising a pharmaceutical carrier and aluminum mandelate selected from the group consisting of $$Al_2O_3 \cdot 6C_6H_5CH(OH)COOH,$$
$$Al_2O_3 \cdot 3C_6H_5CH(OH)COOH, \text{ and}$$
$$Al_2O_3 \cdot 2C_6H_5CH(OH)COOH.$$

2. A composition for the relief of temporary hoarseness comprising a tablet adapted to be slowly dissolved in the mouth and consisting essentially of a pharmaceutical carrier and ½–5 grains of aluminum mandelate selected from the group consisting of $$Al_2O_3 \cdot 6C_6H_5CH(OH)COOH,$$
$$Al_2O_3 \cdot 3C_6H_5CH(OH)COOH, \text{ and}$$
$$Al_2O_3 \cdot 2C_6H_5CH(OH)COOH.$$

3. A method of relieving a person's sore throat which comprises treating the temporary hoarseness with aluminum mandelate selected from the group consisting of $$Al_2O_3 \cdot 6C_6H_5CH(OH)COOH,$$
$$Al_2O_3 \cdot 3C_6H_5CH(OH)COOH, \text{ and}$$
$$Al_2O_3 \cdot 2C_6H_5CH(OH)COOH.$$

References Cited in the file of this patent

U.S. Dispensatory 25, 1955, pp. 227–8, 1746.

Beilstein's Organischen Chemie, vol. 10 (1927), pp. 192, 194, 195, 200; vol. 10, 1st addition (1932), pp. 83, 84, 86; vol. 10, 2nd addition (1949), pp. 114, 118.

Winter: Med. Mschr., 9 (12), December 1955, pp. 815–818 through C.L.M.L. 30: 4980.